US009685800B2

(12) United States Patent
Hatakeyama et al.

(10) Patent No.: US 9,685,800 B2
(45) Date of Patent: Jun. 20, 2017

(54) CHARGING/DISCHARGING SYSTEM

(71) Applicants: Kazunori Hatakeyama, Tokyo (JP);
Yosuke Shinomoto, Tokyo (JP);
Takashi Yamakawa, Tokyo (JP)

(72) Inventors: Kazunori Hatakeyama, Tokyo (JP);
Yosuke Shinomoto, Tokyo (JP);
Takashi Yamakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 204 days.

(21) Appl. No.: 14/416,106

(22) PCT Filed: Feb. 13, 2013

(86) PCT No.: PCT/JP2013/053430
§ 371 (c)(1),
(2) Date: Jan. 21, 2015

(87) PCT Pub. No.: WO2014/020926
PCT Pub. Date: Feb. 6, 2014

(65) Prior Publication Data
US 2015/0288201 A1    Oct. 8, 2015

(30) Foreign Application Priority Data

Jul. 30, 2012    (JP) ................. 2012-168689

(51) Int. Cl.
*H02J 7/00*    (2006.01)
*H01M 10/44*    (2006.01)
(Continued)

(52) U.S. Cl.
CPC .......... *H02J 7/0031* (2013.01); *B60L 3/003* (2013.01); *B60L 3/0069* (2013.01); *B60L 3/04* (2013.01);
(Continued)

(58) Field of Classification Search
CPC ........ H02J 7/0031; H02J 7/0065; H02J 7/022; H01M 10/44; B60L 11/1812;
(Continued)

(56) References Cited

U.S. PATENT DOCUMENTS 8,030,882 B2    10/2011    Ito et al.
8,143,856 B2 *    3/2012    Andrea ................. H02M 7/797
                                                                320/109
(Continued)

FOREIGN PATENT DOCUMENTS

EP    2 279 896 A2    2/2011
JP    2000-166114 A    6/2000
(Continued)

OTHER PUBLICATIONS

Extended European Search Report dated Apr. 21, 2016 issued in corresponding EP patent application No. 13825954.4.
(Continued)

*Primary Examiner* — Nathaniel Pelton
(74) *Attorney, Agent, or Firm* — Posz Law Group, PLC

(57) ABSTRACT

A charging/discharging device includes a charging/discharging connector that electrically connects a storage battery and the charging/discharging device, a cable that is connected to the charging/discharging connector at one end and is connected to the charging/discharging device at the other end, a power conversion unit, a control unit that controls an operation of the power conversion unit, and an abnormality detection unit that outputs an abnormality detection signal for stopping an operation of the power conversion unit to at least any of the control unit and the power conversion unit, when an output from a comparator and an ON signal from the control unit are input to an AND circuit.

20 Claims, 12 Drawing Sheets

(51) Int. Cl.
*B60L 3/00* (2006.01)
*B60L 3/04* (2006.01)
*B60L 11/18* (2006.01)
*H02J 7/02* (2016.01)

(52) U.S. Cl.
CPC ....... *B60L 11/1812* (2013.01); *B60L 11/1818* (2013.01); *B60L 11/1825* (2013.01); *B60L 11/1838* (2013.01); *B60L 11/1842* (2013.01); *B60L 11/1844* (2013.01); *B60L 11/1846* (2013.01); *B60L 11/1861* (2013.01); *H01M 10/44* (2013.01); *H02J 7/0065* (2013.01); *H02J 7/022* (2013.01); *B60L 2210/10* (2013.01); *B60L 2210/30* (2013.01); *B60L 2210/40* (2013.01); *B60L 2230/12* (2013.01); *B60L 2240/80* (2013.01); *Y02E 60/721* (2013.01); *Y02T 10/7005* (2013.01); *Y02T 10/705* (2013.01); *Y02T 10/7044* (2013.01); *Y02T 10/7088* (2013.01); *Y02T 10/7216* (2013.01); *Y02T 10/7241* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
CPC .............. B60L 11/1818; B60L 11/1825; B60L 11/1838; B60L 2230/12; B60L 3/04; B60L 11/1842; B60L 11/1844; B60L 11/1846; B60L 11/1861; B60L 2210/10; B60L 2210/30; B60L 2210/40; B60L 3/003; B60L 3/0069
USPC ................................................ 320/107, 109
See application file for complete search history.

(56) References Cited

U.S. PATENT DOCUMENTS

| | | | |
|---|---|---|---|
| 2009/0242291 | A1 | 10/2009 | Sagawa et al. |
| 2012/0098490 | A1 | 4/2012 | Masuda |
| 2012/0133326 | A1* | 5/2012 | Ichikawa ................ B60L 11/14 320/109 |
| 2013/0181675 | A1 | 7/2013 | Kawasaki et al. |
| 2014/0002018 | A1* | 1/2014 | Montemayor Cavazos ............. B60L 11/1818 320/109 |

FOREIGN PATENT DOCUMENTS

| | | |
|---|---|---|
| JP | 2002-315193 A | 10/2002 |
| JP | 2008-312395 A | 12/2008 |
| JP | 2009-227218 A | 10/2009 |
| JP | 2011-35975 A | 2/2011 |
| JP | 2011-87350 A | 4/2011 |
| JP | 2011-130647 A | 6/2011 |
| JP | 2011-200012 A | 10/2011 |
| JP | 2012-34506 A | 2/2012 |
| WO | 2010/150360 A1 | 12/2010 |
| WO | 2012/070432 A1 | 5/2012 |

OTHER PUBLICATIONS

International Search Report of the International Searching Authority mailed May 21, 2013 for the corresponding international application No. PCT/JP2013/053430 (and English translation).

Office Action mailed Feb. 25, 2014 for the corresponding JP application No. 2012-168689 (and English translation).

Office Action mailed Sep. 25, 2015 in the corresponding KR application No. 10-2015-7001391 (with English translation).

* cited by examiner

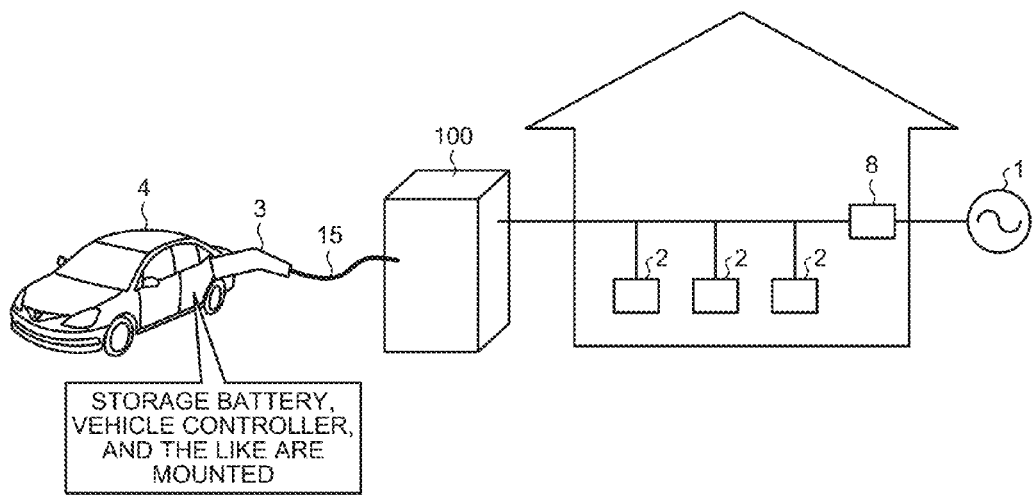
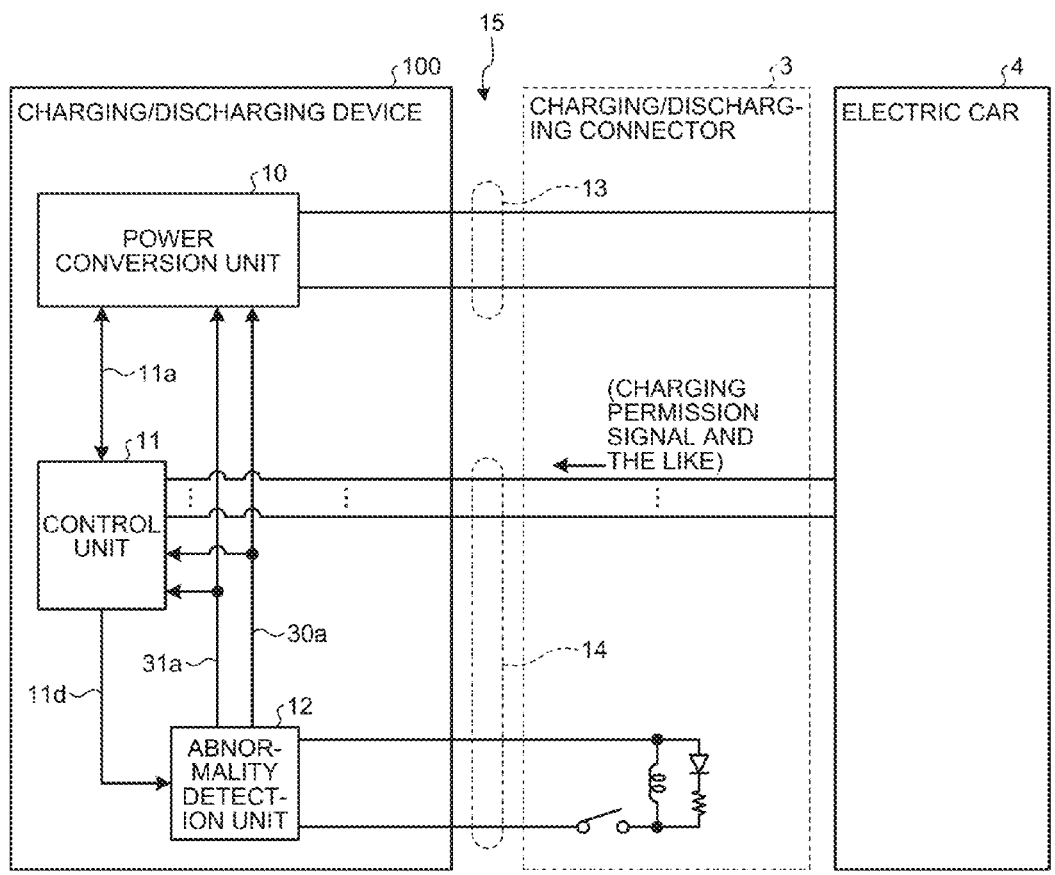

CHARGING/DISCHARGING SYSTEM

CROSS REFERENCE TO RELATED APPLICATION

This application is a U.S. national stage application of International Patent Application No. PCT/JP2013/053430 filed on Feb. 13, 2013, and is based on Japanese Patent Application No. 2012-168689 filed on Jul. 30, 2012, the contents of which are incorporated herein by reference.

TECHNICAL FIELD

The present invention relates to a charging/discharging device.

BACKGROUND

In recent years, charging/discharging devices that charge a storage battery mounted on an electric car and supply power accumulated in the storage battery to household loads (such as an air conditioner and a refrigerator) have attracted attention along with the popularization of electric cars (for example, Patent Literature 1 mentioned below).

A charging/discharging cable connected to the charging/discharging device is provided with a charging/discharging connector (hereinafter, "connector") that can be attached to or detached from a connector connection port of an electric car, and the storage battery mounted on the electric car is electrically connected to the charging/discharging device via the connector. Because the voltage of the storage battery reaches several hundred volts, if an operator touches a connector electrode or the like during energization, there is a risk that the operator receives an electric shock. Therefore, when the connector is connected to the connector connection port, a predetermined communication is performed between the charging/discharging device and the vehicle controller in the electric car, and after safety is confirmed, charging/discharging is performed. A mechanical lock mechanism (a connector disconnection prevention mechanism) is provided to the connector. For example, when a charging/discharging starting operation is performed in the charging/discharging device, a lock-actuator drive signal (a signal for operating the lock mechanism) is transmitted to the connector from the charging/discharging device to actuate the lock mechanism provided to the connector, thereby maintaining the mechanical connection state between the connector connection port and the connector.

Patent Literature

Patent Literature 1: Japanese Patent Application Laid-open No. 2012-34506

However, if a vehicle starts running when charging/discharging is in progress between the storage battery and the charging/discharging device, the vehicle state becomes such that the connector is disconnected or the charging/discharging cable is cut, and the electrical connection between the storage battery and the charging/discharging device may be disconnected. In the following explanations, the state where the electrical connection between the storage battery and the charging/discharging device is disconnected is referred to as "disconnection or the like". When disconnection or the like occurs, it is required to ensure safety of an operator by stopping charging/discharging promptly. Therefore, a conventional technique represented by Patent Literature 1 mentioned above includes an abnormality detection unit that transmits an abnormality detection signal to the control unit of the power conversion unit (an inverter or a converter) in the charging/discharging device to stop an operation of the power conversion unit in terms of hardware. The abnormality detection unit includes not only a disconnection detection element that detects disconnection or the like but also, for example, an abnormality detection element that detects an abnormality resulting from causes other than disconnection or the like having occurred in the charging/discharging device (overcurrent, overvoltage, or the like). The power conversion unit is provided with a protection function for stopping an operation of the power conversion unit when an abnormality is detected, and the operation of the power conversion unit is stopped until the protection function is cleared after the input of the abnormality detection signal. However, the power conversion unit cannot discriminate whether the abnormality detection signal is caused by disconnection or the like or by other causes. Therefore, when the protection function of the power conversion unit is cleared by a clearing signal from the control unit even if an abnormality, for example, overcurrent, has actually occurred, the power conversion unit may be broken due to the overcurrent.

Meanwhile, a solenoid that actuates the lock mechanism of the connector is provided in the connector, and a switch that feeds power to the solenoid is provided in the charging/discharging device. For example, when charging/discharging is started, the switch is turned on (CLOSE) by an ON signal from the control unit, thereby feeding power to the solenoid, and when charging/discharging is stopped, the switch is turned off (OPEN) by an OFF signal from the control unit, thereby stopping power feeding to the solenoid. Therefore, when the connector is connected to an electric car and charging/discharging is stopped, solenoid driving power is not supplied to the solenoid of the connector and thus a latch provided in the connector does not operate. The connector is provided with an interlocking switch that interlocks with the latch, and one end of the interlocking switch is connected to the solenoid and the other end thereof is connected to the input terminal of the disconnection detection element. When power is not supplied to the solenoid, the interlocking switch is turned off (OPEN). Therefore, when charging/discharging is stopped, the latch does not operate and the interlocking switch is turned off (OPEN), and thus a voltage lower than a reference voltage is applied to the input terminal of the disconnection detection element. Accordingly, the disconnection detection element determines that disconnection or the like has occurred and outputs an abnormality detection signal to the control unit and the power conversion unit. Therefore, although the connector is connected to the electric car and charging/discharging of the electric car has been stopped, the abnormality detection signal is output to the power conversion unit. In the power conversion unit that has received the abnormality detection signal, the protection function operates and the power conversion unit cannot be activated until the protection function is cleared.

In this way, the conventional technique represented by Patent Literature 1 mentioned above cannot achieve both prevention of breakage of the power conversion unit when an abnormality such as overcurrent has occurred and prevention of an unnecessary operation of the protection function of the power conversion unit when charging/discharging is not performed, and cannot respond to the need of further improving the reliability thereof.

SUMMARY

The present invention has been achieved in view of the above problems, and an object of the present invention is to provide a charging/discharging device that can further improve its reliability.

In order to solve the above problems and achieve the object, the present invention relates to a charging/discharging device that is interposed between a system power supply and a storage battery and performs charging/discharging of the storage battery, including: a charging/discharging connector that electrically connects the storage battery and the charging/discharging device; a charging/discharging cable that is connected to the charging/discharging connector at one end and is connected to the charging/discharging device at another end; a power conversion unit that operates as an AC/DC converter when AC power is input, and operates as a DC/AC converter when DC power from the storage battery is input; a control unit that controls an operation of the power conversion unit; and an abnormality detection unit that outputs an abnormality detection signal for stopping an operation of the power conversion unit to at least any of the control unit and the power conversion unit, when it is detected that electrical connection between the storage battery and the charging/discharging device has been disconnected and a signal indicating operation start of the power conversion unit is output from the control unit.

According to the present invention, by providing a function of stopping a protection function of a power conversion unit only when disconnection or the like occurs, it is possible to achieve both prevention of breakage of the power conversion unit when an abnormality such as overcurrent has occurred and prevention of an unnecessary operation of the protection function of the power conversion unit when charging/discharging is not performed. Accordingly, an effect is obtained where further improvement of the reliability can be achieved.

BRIEF DESCRIPTION OF DRAWINGS

FIG. 1 is a diagram schematically showing the connection relation among a charging/discharging device according to an embodiment of the present invention, an electric car, a system power supply, and household loads.

FIG. 2 is a diagram showing the connection relation between the charging/discharging device and a charging/discharging cable.

DETAILED DESCRIPTION

Exemplary embodiments of a charging/discharging device according to the present invention will be explained below in detail with reference to the drawings. The present invention is not limited to the embodiments.

First Embodiment.

Figure 3:
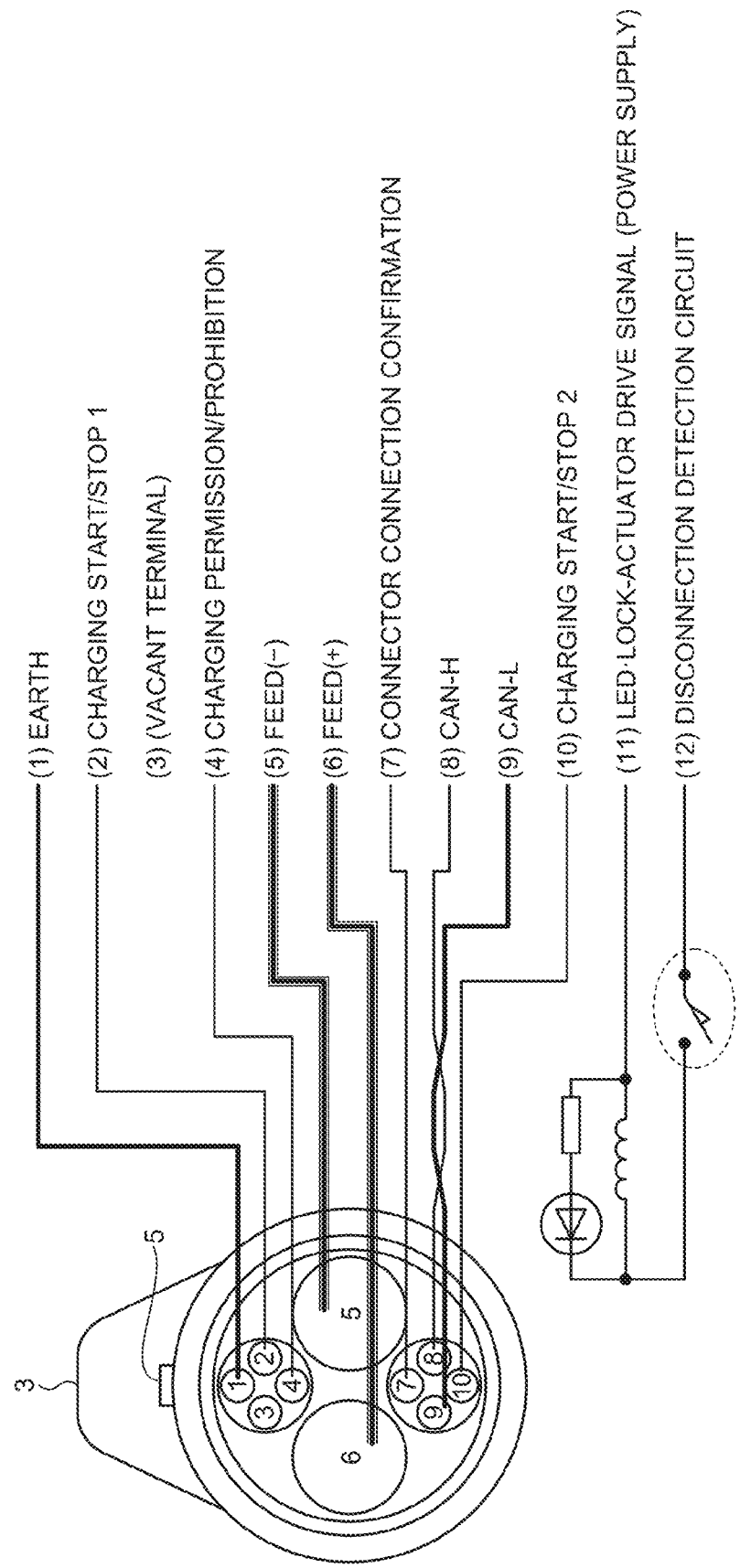
FIG. 3 is a diagram showing the structure of a charging/discharging connector.

FIG. 1 is a diagram schematically showing the connection relation among a charging/discharging device 100 according to an embodiment of the present invention, an electric car (hereinafter, "car") 4, a system power supply 1, and household loads 2. FIG. 2 is a diagram showing the connection relation between the charging/discharging device 100 and a charging/discharging cable (hereinafter, "cable") 15. FIG. 3 is a diagram showing the structure of a charging/discharging connector (hereinafter, "connector") 3.

In FIG. 1, a storage battery for running, a vehicle controller, and the like (all not shown) are mounted on the car 4. The system power supply 1 is electrically connected to the household loads 2 via a switch 8 and is electrically connected to the charging/discharging device 100. One end of the cable 15 is connected to the charging/discharging device 100, and the connector 3 attachable to and detachable from the connector connection port (not shown) provided in the body of the car 4 is provided at the other end of the cable 15.

A lithium-ion battery is generally used for the storage battery in the car 4. However, because a voltage per one battery cell is about 3 to 4 volts, a plurality of battery cells are serially connected, thereby increasing the voltage between both ends of the storage battery. In the car 4, for example, 96 battery cells having, for example, 3.7 V/cell are serially connected, and the voltage in this case between both ends of the storage battery reaches 355.2 volts. The number of battery cells of the storage battery is different for each type of vehicle because the running distance and the like are different according to the type of vehicle, and the voltage of the storage battery becomes 200 to 400 volts because the battery of each cell is different for each manufacturer. Such a storage battery with increased voltage is mounted on the car 4 in a state of being insulated from the body of the car 4 and is in a floating state in which both ends of the storage battery are not connected to the earth of the body.

The vehicle controller measures information related to the storage battery (for example, battery voltage, charging/discharging current, battery capacity, SOC (State of Charge), and temperature) to monitor a charging/discharging operation. The vehicle controller performs communication of the information with the charging/discharging device 100 such that a charge acceptable amount and a discharge acceptable amount of the storage battery are not exceeded, and outputs an operation command to the charging/discharging device 100. The vehicle controller also transmits the information related to the storage battery to the charging/discharging device 100 as required, and requests information from the charging/discharging device 100.

An auxiliary machine battery incorporated in the car 4 is used as the power supply of the vehicle controller, and the auxiliary machine battery is charged from a high-voltage storage battery. A battery having a terminal voltage of, for example, 12 volts or 24 volts is generally used for the auxiliary machine battery. However, the battery is not limited thereto. The auxiliary machine battery is insulated from the high-voltage storage battery for running the car 4 and is grounded to the vehicle body. Because there are tires between the body and the ground, the car 4 is grounded through the tires and thus it cannot be said that the car 4 is completely grounded. However, because the impedance of the tires is relatively low with respect to a supervoltage potential such as thunder, the current of thunder is discharged to the ground through the tires. Because an engine is connected to a power generator in an engine car, the auxiliary machine battery is charged by the power generator during engine operation. However, because the electric car does not include a power generator, the auxiliary machine battery is charged by the high-voltage storage battery. At this point, an isolated step-down charging circuit is inserted between the storage battery and the auxiliary machine battery.

In FIG. 2, the charging/discharging device 100 includes a power conversion unit 10, a control unit 11, and an abnormality detection unit 12. A power line 13 in the cable 15 is connected to the power conversion unit 10, and charging/discharging is performed between the charging/discharging device 100 and the storage battery of the car 4 by the power line 13. A signal line group 14 in the cable 15 is connected to the control unit 11, and a predetermined communication is performed between the control unit 11 and the vehicle controller by the signal line group 14.

The abnormality detection unit 12 has a function of detecting disconnection or the like (connector disconnection, disconnection of the cable 15, or the like) and outputting an abnormality detection signal 30a indicating that disconnection or the like has occurred, and a function of detecting an abnormality such as overcurrent or overvoltage (an abnormality other than disconnection or the like) and outputting an abnormality detection signal 31a indicating that an abnormality other than disconnection or the like has occurred. Details of the abnormality detection unit 12 are described later.

FIG. 3 shows an example of a terminal group provided in the connector 3. For example, a "feed (−)" terminal and a "feed (+)" terminal connected with the power line 13, a "CAN-H" terminal and a "CAN-L" terminal connected with the signal line group 14, a "charging permission/prohibition" terminal, a "lock-actuator drive signal" terminal, and a terminal for transferring other I/O signals are provided in the connector 3.

The "CAN-H" terminal and the "CAN-L" terminal are terminals for the control unit 11 to perform a CAN (Controller Area Network) communication required between the car 4 and the control unit 11. By the CAN communication, for example, an appropriate charging current is specified depending on the state of the storage battery by the vehicle controller of the car 4, and in the charging/discharging device 100, DC current is supplied according to the information transmitted from the vehicle controller. A lock mechanism 5, which is a mechanical connector disconnection prevention function, is provided in the connector 3. For example, the lock mechanism 5 functions, whereby the mechanical connection state between the connector connection port of the car 4 and the connector 3 is maintained. An operation of the lock mechanism 5 is described later.

Figure 4:
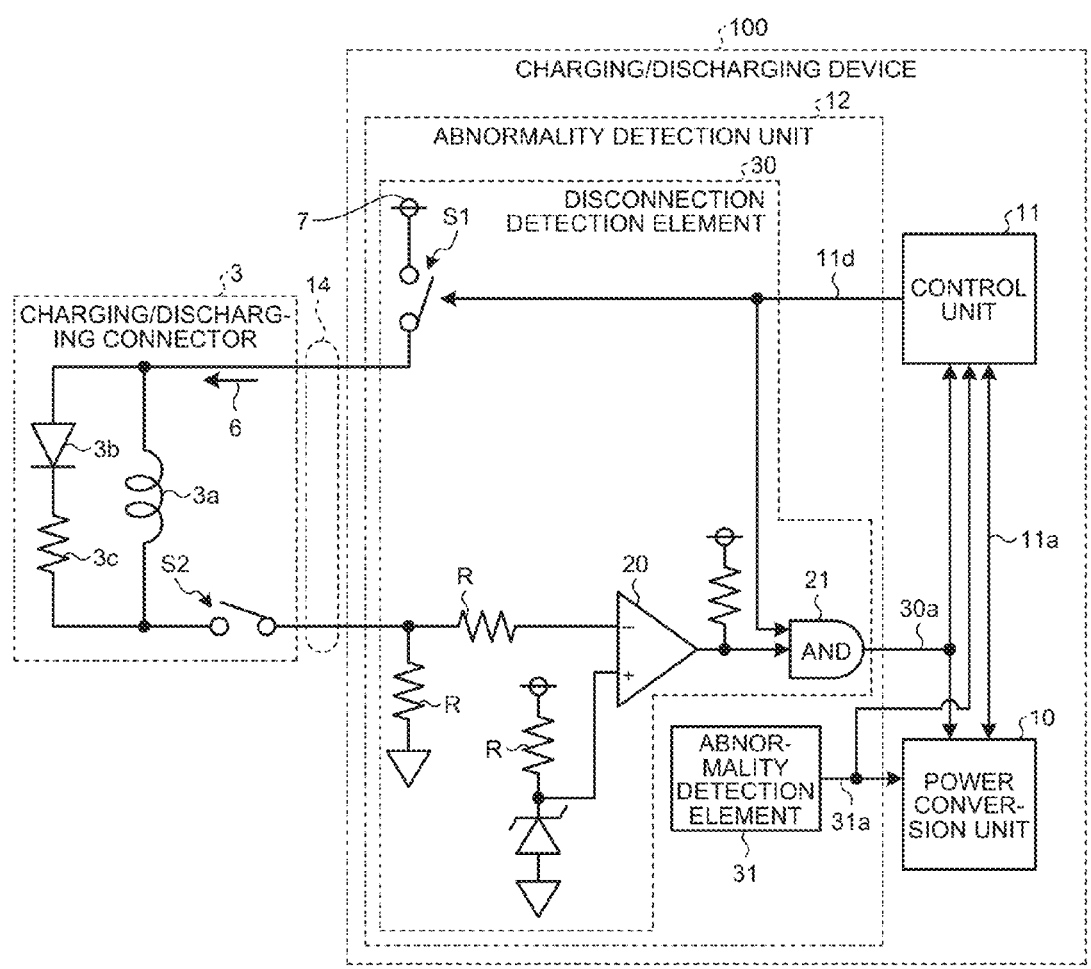
FIG. 4 is a diagram showing the configuration of an abnormality detection unit according to a first embodiment of the present invention.

FIG. 4 is a diagram showing the configuration of the abnormality detection unit 12 according to a first embodiment of the present invention. The abnormality detection unit 12 is configured to include a disconnection detection element 30 and an abnormality detection element 31. The disconnection detection element 30 includes a switch S1 for solenoid-drive power supply controlled by an ON/OFF signal 11d from the control unit 11, a comparator 20, an AND circuit 21, and a plurality of resistors R.

The switch S1 is connected at one end to a circuit power supply 7 and is connected at the other end to the connection end between a solenoid 3a and a diode 3b in the connector 3. The ON/OFF signal 11d from the control unit 11 is input to the switch S1. For example, when charging/discharging of the car 4 is started, an ON signal (the ON/OFF signal 11d) to close the switch S1 is output from the control unit 11. The switch S1 becomes ON due to the ON signal and the circuit power supply 7 is supplied to the connector 3 via the signal line group 14. In the following explanations, the power to be supplied to the connector 3 is referred to as "lock-actuator drive signal 6".

A divided input voltage is applied to one input terminal (a negative-side input terminal) of the comparator 20, and a reference voltage is applied to the other input terminal (a positive-side input terminal) of the comparator 20. The output terminal of the comparator 20 is connected to one input terminal of the AND circuit 21. The comparator 20 compares the voltage on the negative-side input terminal with the voltage on the positive-side input terminal. When the voltage on the negative-side input terminal is lower than the voltage on the positive-side input terminal, the output terminal of the comparator 20 becomes High. For example, when a switch S2 in the connector 3 becomes open and connector disconnection occurs, the negative-side input terminal becomes a GND potential; therefore, the voltage on the negative-side input terminal becomes lower than the voltage on the positive-side input terminal. Therefore, the output terminal of the comparator 20 becomes High, which is input to the AND circuit 21 as an output signal.

The output signal of the comparator 20 and the ON/OFF signal 11d from the control unit 11 are input to the AND circuit 21, and when an AND condition of these signals is established, the AND circuit 21 outputs the abnormality detection signal 30a indicating that disconnection or the like has occurred. When having detected an abnormality other than disconnection, the abnormality detection element 31 outputs the abnormality detection signal 31a indicating that an abnormality other than disconnection or the like has occurred.

The connector 3 includes the diode 3b, a resistor 3c with one end thereof being connected to the cathode of the diode 3b, the solenoid 3a with one end thereof being connected to the anode of the diode 3b and the other end thereof being connected the other end of the resistor 3c, and the switch S2. The switch S2 is a switch interlocking with the lock mechanism 5. The switch S2 is connected at one end to the connection end between the solenoid 3a and the resistor 3c and is connected at the other end to the negative-side input terminal of the comparator 20 via the signal line group 14 and the resistor R.

Operations of the present embodiment are explained below. For example, an operation when charging/discharging of an electric car is started in a state where connector disconnection has not occurred is explained here. For example, when a starting operation of charging/discharging is performed in the charging/discharging device 100, the control unit 11 outputs the ON signal to close the switch S1 and the ON signal is input to the switch S1. The switch S1 is turned ON by the signal and the lock-actuator drive signal 6 is supplied to the solenoid 3a.

Accordingly, the lock mechanism 5 functions and thus the mechanical connection state between the connector connection port of the car 4 and the connector 3 is maintained, thereby preventing an electric shock due to connector disconnection during charging/discharging. The switch S2 is turned ON interlocking with the lock mechanism 5, and a voltage higher than the voltage to be applied to the positive-side input terminal is applied to the negative-side input terminal of the comparator 20; therefore, the output of the comparator 20 becomes Low. Accordingly, the AND condition of the AND circuit 21 is not established; therefore, the abnormality detection signal 30a is not output.

Next, an operation when connector disconnection has occurred after charging/discharging of the car 4 is started is explained. When connector disconnection has occurred after charging/discharging of the car 4 is started, the lock-actuator drive signal 6 is not supplied to the solenoid 3a and the comparator 20. At this point, the voltage to be applied to the negative-side input terminal of the comparator 20 becomes lower than the voltage to be applied to the positive-side input terminal because of the division ratio between the resistance component of the solenoid 3a and the resistor R of the negative-side input terminal of the comparator 20, and the output of the comparator 20 changes from Low to High. Because the ON signal from the control unit 11 is also input to the AND circuit 21, the AND condition of the AND circuit 21 is established and the abnormality detection signal 30a is output from the AND circuit 21.

The abnormality detection signal 30a is input, for example, to the control unit 11 and the power conversion unit 10, and the control unit 11 to which the abnormality detection signal 30a is input stops the output of operation signals 11a to the power conversion unit 10. Similarly, the power conversion unit 10 to which the abnormality detection signal 30a is input also stops the output of drive signals 18a from protection units 19 described later to power conversion units (16 and 17). Due to this operation, the operation of the power conversion unit 10 is stopped, thereby preventing an electric shock when the connector is disconnected during charging/discharging.

In FIG. 4, the abnormality detection signal 30a from the AND circuit 21 is input to both the control unit 11 and the power conversion unit 10. However, the input destination is not limited thereto. The power conversion unit 10 is configured with hardware but the control unit 11 is configured with software; therefore, the control unit 11 executes discrete control. Therefore, there is a time lag from the input of the abnormality detection signal 30a until the operation signals 11a are stopped. However, there is no time lag in the power conversion unit 10.

Accordingly, if the charging/discharging device 100 is configured such that the abnormality detection signal 30a is input only to the power conversion unit 10, the configuration of the charging/discharging device 100 can be simplified and the operation of the power conversion unit 10 can be stopped immediately. If the charging/discharging device 100 is configured such that the abnormality detection signal 30a is input only to the control unit 11, although there is a slight time lag in the control unit 11, the manufacturing cost of the charging/discharging device 100 can be reduced. Furthermore, if the charging/discharging device 100 is configured such that the abnormality detection signal 30a is input to the control unit 11 and the power conversion unit 10, the operation of the power conversion unit 10 can be stopped immediately and the reliability can be improved.

Figure 5:
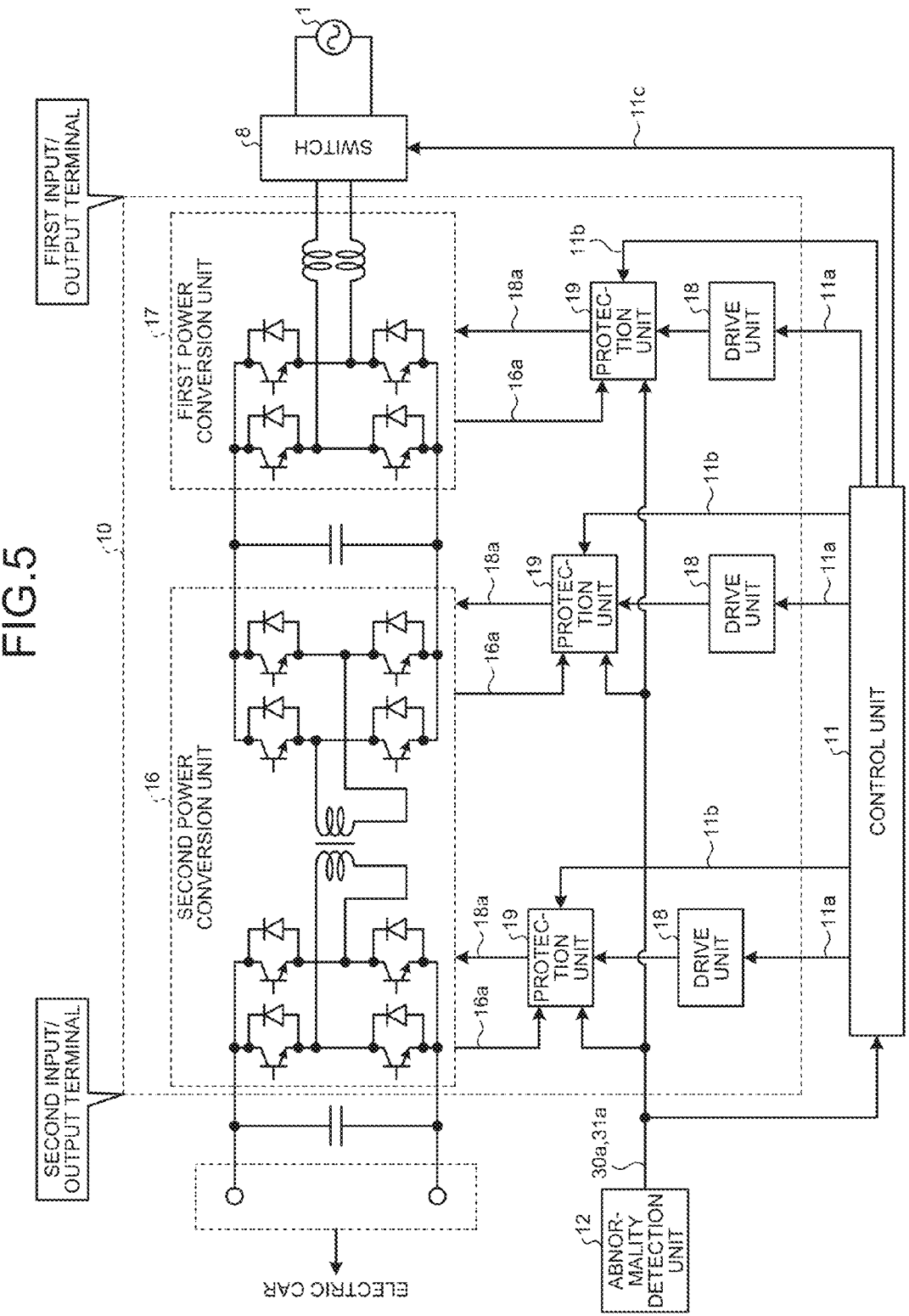
FIG. 5 is a diagram showing details of a power conversion unit and a control unit shown in FIG. 2.

FIG. 5 is a diagram showing details of the power conversion unit 10 and the control unit 11 shown in FIG. 2. The power conversion unit 10 is configured to include a second power conversion unit 16, a first power conversion unit 17, a plurality of protection units 19, and a plurality of drive units 18.

In FIG. 5, as an example, one drive unit 18 for controlling the switching elements of the first power conversion unit 17 and two drive units 18 for individually controlling the primary-side switching elements and the secondary-side switching elements of the second power conversion unit 16 are shown. The protection units 19 are provided on the output side of the drive units 18, respectively.

To simplify explanations, in FIG. 5, the abnormality detection signals 30a and 31a are input to the control unit 11, and the operation signals 11a, protection clearing signals 11b, and an opening/closing signal 11c are output from the control unit 11. However, a signal to be input to the control unit 11 and a signal to be output from the control unit 11 are not limited thereto, and for example, a signal from the "charging permission/prohibition" terminal shown in FIG. 3 and a signal from a "charging start/stop" terminal shown in FIG. 3 are also input to the control unit 11.

The first power conversion unit 17 operates as an AC/DC converter or a DC/AC converter. When the first power conversion unit 17 operates as an AC/DC converter, AC power supplied from the system power supply 1 via the switch 8 is converted to DC power and is output to the second power conversion unit 16. When the first power conversion unit 17 operates as a DC/AC converter, DC power supplied from the second power conversion unit 16 is converted to AC power and is output to the switch 8.

The second power conversion unit 16 operates as a DC/DC converter to convert DC power from the first power conversion unit 17 to a voltage capable of being supplied to the car 4 and convert DC power from the car 4 to a voltage capable of being input to the first power conversion unit 17.

The drive units 18 respectively generate the drive signals 18a (PWM gate pulses) that control the switching elements of the first power conversion unit 17 and the second power conversion unit 16 on the basis of the operation signals 11a from the control unit 11.

The protection units 19 respectively output the drive signals 18a from the drive units 18 to the power conversion units (16 and 17), when the abnormality detection signal 30a or the abnormality detection signal 31a from the abnormality detection unit 12 is not input thereto. When the abnormality detection signal 30a or the abnormality detection signal 31a is input, the protection units 19 stop the output of the drive signals 18a to the power conversion units (16 and 17) and maintain this state until the protection clearing signals 11b are input from the control unit 11. In FIG. 5, signals 16a indicating that overcurrent or overvoltage has occurred are input to the protection units 19. However, the configuration may be such that the signals 16a are taken into the abnormality detection element 31 of the abnormality detection unit 12.

The first power conversion unit 17 shown in FIG. 5 is formed of a single-phase inverter having a four-element configuration; however, the first power conversion unit 17 can be formed of a three-phase inverter having a six-element configuration. In the case of a single-phase inverter, the output of the first power conversion unit 17 is a single-phase two-wire output. However, a three-phase inverter can have a single-phase three-wire output and is also applicable to a three-phase power supply. The second power conversion unit 16 shown in FIG. 5 is formed of two single-phase inverters. However, the configuration of the second power conversion unit 16 is not limited thereto. For example, the second power conversion unit 16 can be formed of two three-phase inverters. In this case, an isolation transformer having a Y-Y connection, a Y-Δ connection, or a Δ-Δ connection is used as the isolation transformer. Furthermore, when the second power conversion unit 16 is configured by combining a single-phase inverter and a three-phase inverter, an isolation transformer having a Scott connection is used.

In the second power conversion unit 16 shown in FIG. 5, because the potential is different between the primary side and the secondary side of the isolation transformer, a plurality of drive units 18 are used in the power conversion unit 10 in order to isolate the operation signals 11a output from a single control unit 11. However, the configuration thereof is not limited to that shown in FIG. 5 as long as equivalent effects can be obtained.

In FIG. 5, the isolation transformer is provided between the two single-phase transformers. However, the isolation transformer can be provided on the AC side of the first power conversion unit 17. In this case, because the power-supply frequency is input to the isolation transformer, the isolation transformer becomes large. However, the second power conversion unit 16 is not required; therefore, the number of switching elements used in the power conversion unit 10 is reduced, thereby enabling switching losses to be reduced and the reliability to be improved. Furthermore, because the two single-phase inverters have the same potential, for example, the drive unit 18 for isolating the operation signal 11a can be eliminated and thus a delay and variation in signal transmission due to isolation can be reduced. Accordingly, the controllability and the frequency (a carrier frequency) of the drive signals 18a can be improved.

Figure 6:
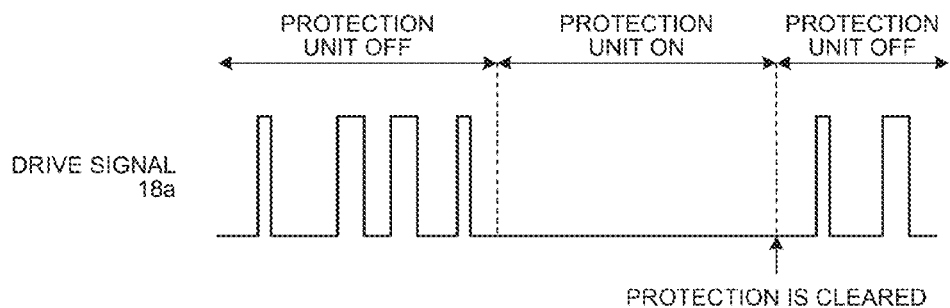
FIG. 6 is an explanatory diagram of an operation of a protection unit.

FIG. 6 is an explanatory diagram of an operation of the protection units 19. When the abnormality detection signal 30a or the abnormality detection signal 31a has not been input to the protection units 19, the protection units 19 are in an OFF state as shown on the left side of FIG. 6. At this point, the drive signal 18a is input to each of the power conversion units (16 and 17). When the abnormality detection signal 30a or the abnormality detection signal 31a is input to the protection units 19, the protection units 19 become an ON state as shown in the middle of FIG. 6. At this point, the drive signal 18a is not input to each of the power conversion units (16 and 17). Thereafter, when protection by the protection units 19 is cleared by the protection clearing signals 11b output from the control unit 11, the protection units 19 become the OFF state as shown on the right side of FIG. 6. Therefore, the drive signal 18a is input again to each of the power conversion units (16 and 17).

Figure 7:
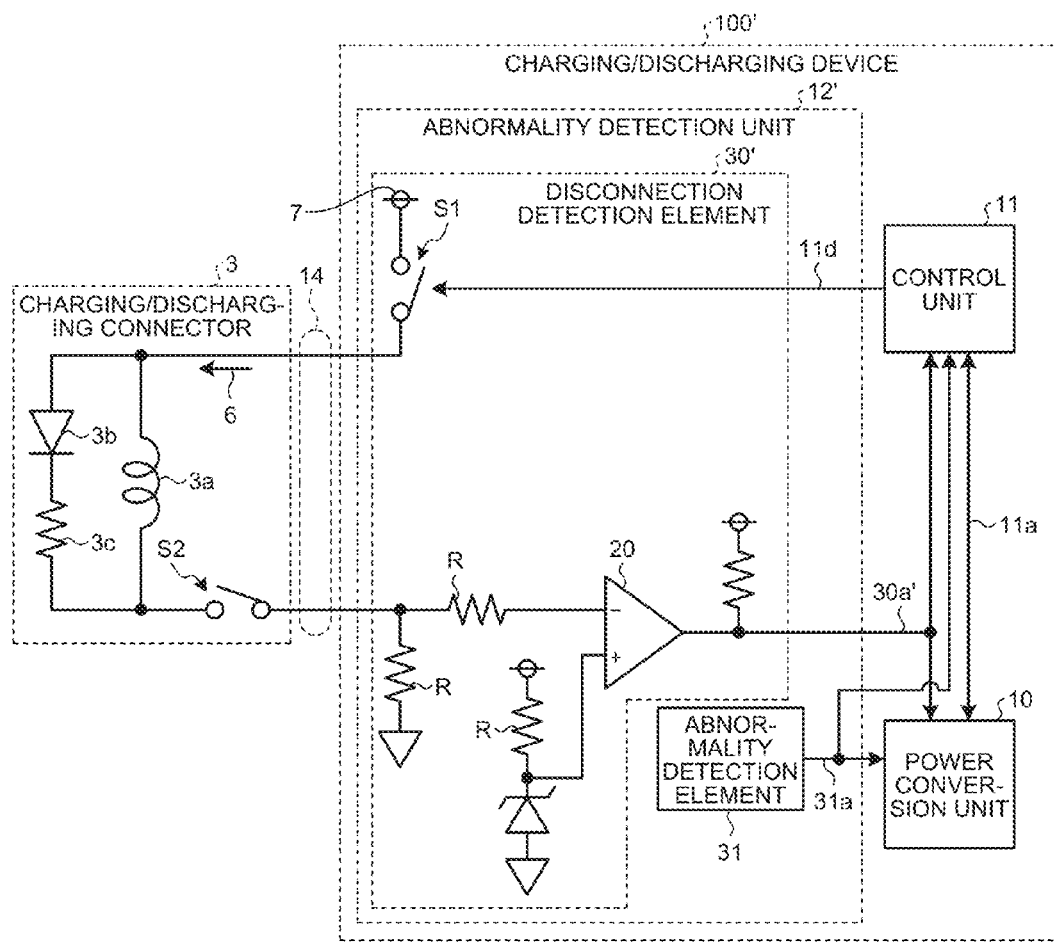
FIG. 7 is a first diagram for explaining an operation of a conventional charging/discharging device.
Figure 8:
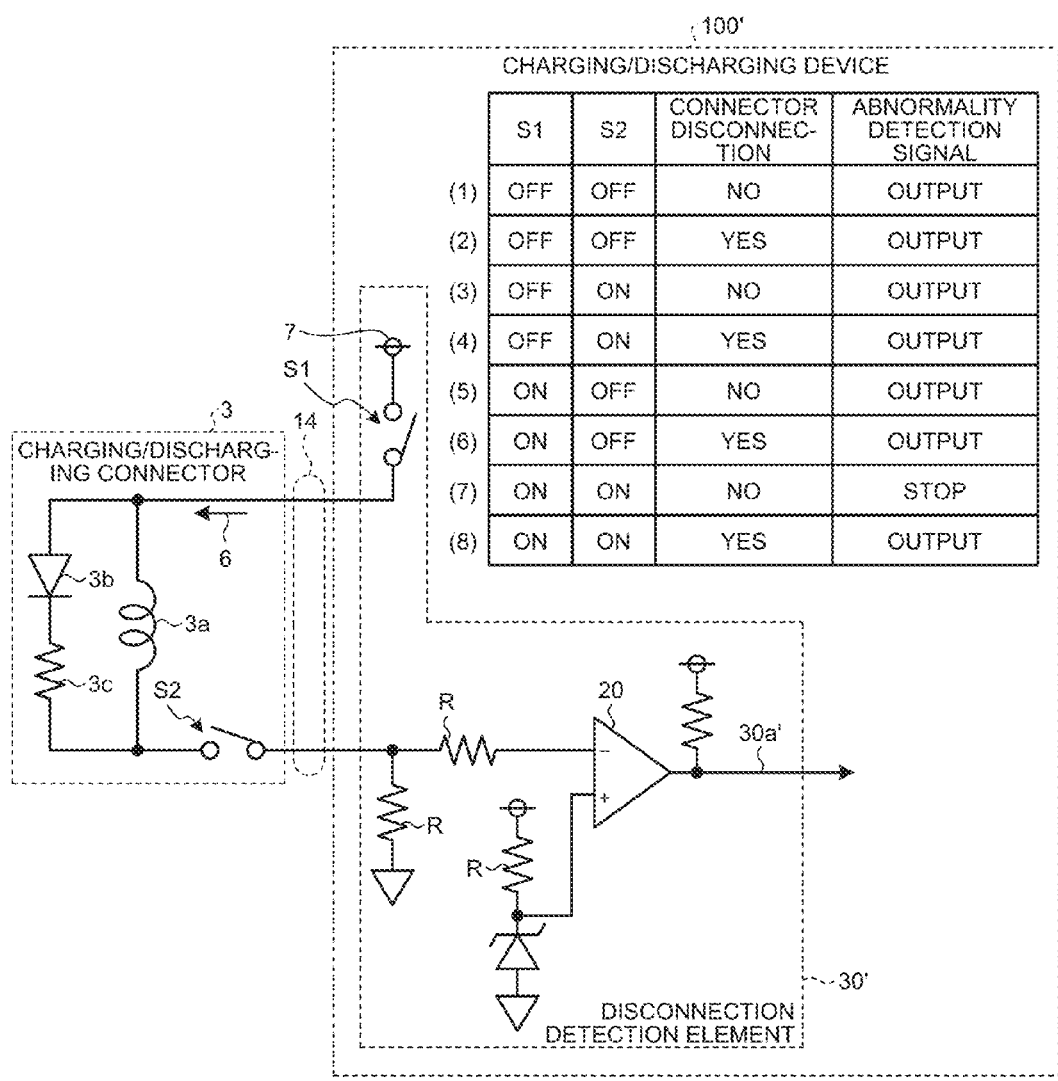
FIG. 8 is a second diagram for explaining an operation of the conventional charging/discharging device.

FIG. 7 is a first diagram for explaining an operation of a conventional charging/discharging device 100' and FIG. 8 is a second diagram for explaining an operation of the conventional charging/discharging device 100'. Like parts as those shown in FIGS. 1 to 6 are denoted by like reference signs and explanations thereof will be omitted, and only different points from FIGS. 1 to 6 are explained here.

The charging/discharging device 100' shown in FIG. 7 is provided with a disconnection detection element 30' instead of the disconnection detection element 30 shown in FIG. 4. The disconnection detection element 30' is not provided with the AND circuit 21 shown in FIG. 4, and the output of the comparator 20 is input to the control unit 11 and the power conversion unit 10 as an abnormality detection signal 30a'.

The table shown in FIG. 8 shows the relation of the switch S1 and the switch S2 provided in the charging/discharging device 100', the presence or absence of connector disconnection, and the presence or absence of the output of the abnormality detection signal 30a'. In (1) in the table, when charging/discharging is not performed, the switch S1 becomes OFF and the lock-actuator drive signal 6 is not supplied to the solenoid 3a. Therefore, the lock mechanism 5 does not function and thus the switch S2 becomes OFF as well. Accordingly, the voltage applied to the negative-side input terminal of the comparator 20 is lower than the voltage applied to the positive-side input terminal; therefore, the output of the comparator 20 becomes High and thus the abnormality detection signal 30a' is output from the comparator 20.

In this manner, in the conventional charging/discharging device 100', when charging/discharging is not performed, the lock-actuator drive signal 6 is not supplied to the solenoid 3a. Therefore, the abnormality detection signal 30a' is output although the connector 3 is being connected. Accordingly, the protection units 19 of the power conversion unit 10 function due to the abnormality detection signal 30a', and even if the charging/discharging start is made, each of the power conversion units (16 and 17) cannot be activated until the protection clearing signal 11b is output.

Meanwhile, the power conversion unit 10 and the control unit 11 cannot discriminate whether the signal from an abnormality detection unit 12' is generated due to connector disconnection or other causes (overcurrent or the like). Therefore, when the protection units 19 are functioning due to overcurrent or the like, if the control unit 11 determines that the signal from the abnormality detection unit 12' is the abnormality detection signal 30a' indicating disconnection and the protection clearing signals 11b are output, the power conversion unit may be broken.

The charging/discharging device 100 according to the first embodiment is configured such that the abnormality detection signal 30a is output only when the AND condition of the output signal from the comparator 20 and the ON/OFF signal 11d from the control unit 11 is established. Therefore, when charging/discharging is not performed, that is, when the switch S1 is OFF, the abnormality detection signal 30a is not output. Therefore, the protection units 19 of the power conversion unit 10 do not function when charging/discharging is not performed, except when the abnormality detection signal 31a is being output. Thus, when a charging/discharging starting operation is performed, the power conversion units (16 and 17) can be activated promptly.

(2) in the table expresses the states of the switch S1, the switch S2, and the abnormality detection signal 30a' when connector disconnection occurs in the case of (1), and when connector disconnection occurs, the abnormality detection signal 30a' is output.

(3) in the table expresses the state where although charging/discharging is not performed, for example, the switch S2 does not return to OFF from ON and the abnormality detection signal 30a' is being continuously output from the comparator 20. Also in this case as in the case of (1), the lock-actuator drive signal 6 is not supplied to the solenoid 3a, and thus disconnection is determined and the abnormality detection signal 30a' is output.

(4) in the table expresses the states of the switch S1, the switch S2, and the abnormality detection signal 30a' when connector disconnection occurs in the case of (3), and when connector disconnection occurs, the abnormality detection signal 30a' is output as in the case of (2).

(5) to (8) in the table express the operation of the conventional charging/discharging device 100' when charging/discharging is in progress. For example, in (7), when the switch S2 is ON and connector disconnection has not occurred when charging/discharging is in progress, the output of the abnormality detection signal 30a' is stopped.

Hereinafter, explanations of the operation in (5), (6), and (8) will be omitted.

Figure 9:
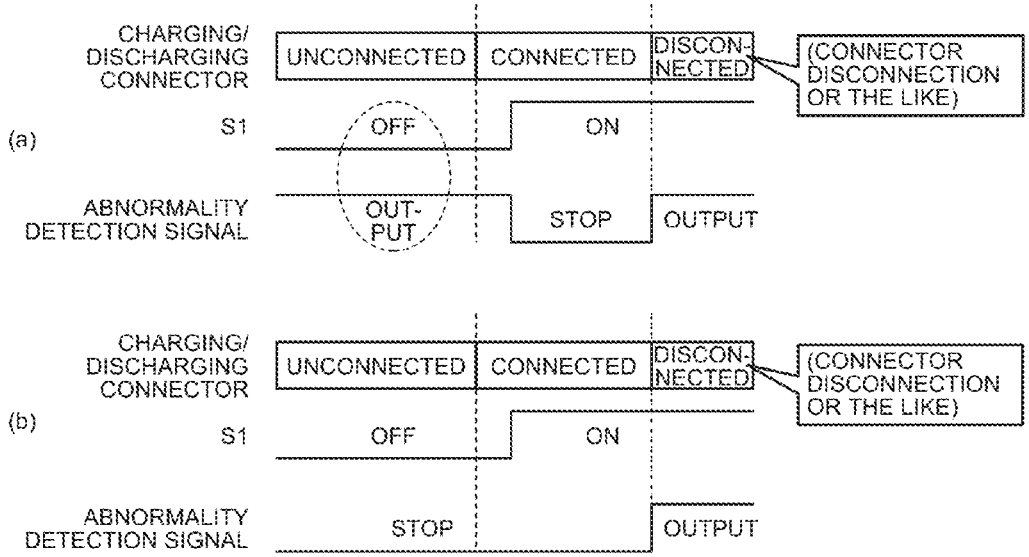
FIG. 9 is an explanatory diagram of a comparison between operations of a conventional disconnection detection element and of a disconnection detection element according to the first embodiment of the present invention.

FIG. 9 is an explanatory diagram of a comparison between operations of the conventional disconnection detection element 30' and of the disconnection detection element 30 according to the first embodiment of the present invention. FIG. 9(a) shows the relation of the abnormality detection signal 30a' output from the conventional disconnection detection element 30', the switch S1, and the connector 3. FIG. 9(b) shows the relation of the abnormality detection signal 30a output from the disconnection detection element 30, the switch S1, and the connector 3.

In FIG. 9(a), in the conventional disconnection detection element 30', when the connector 3 is not connected and the switch S1 is OFF, the abnormality detection signal 30a' is output, and thereafter, when the switch S1 is changed from OFF to ON, the output of the abnormality detection signal 30a' is stopped. On the other hand, in FIG. 9(b), in the disconnection detection element 30 according to the first embodiment, when the connector 3 is not connected and the switch S1 is OFF, the output of the abnormality detection signal 30a is stopped. When the switch S1 is changed from OFF to ON and connector disconnection or the like occurs, the abnormality detection signal 30a is output.

Figure 10:
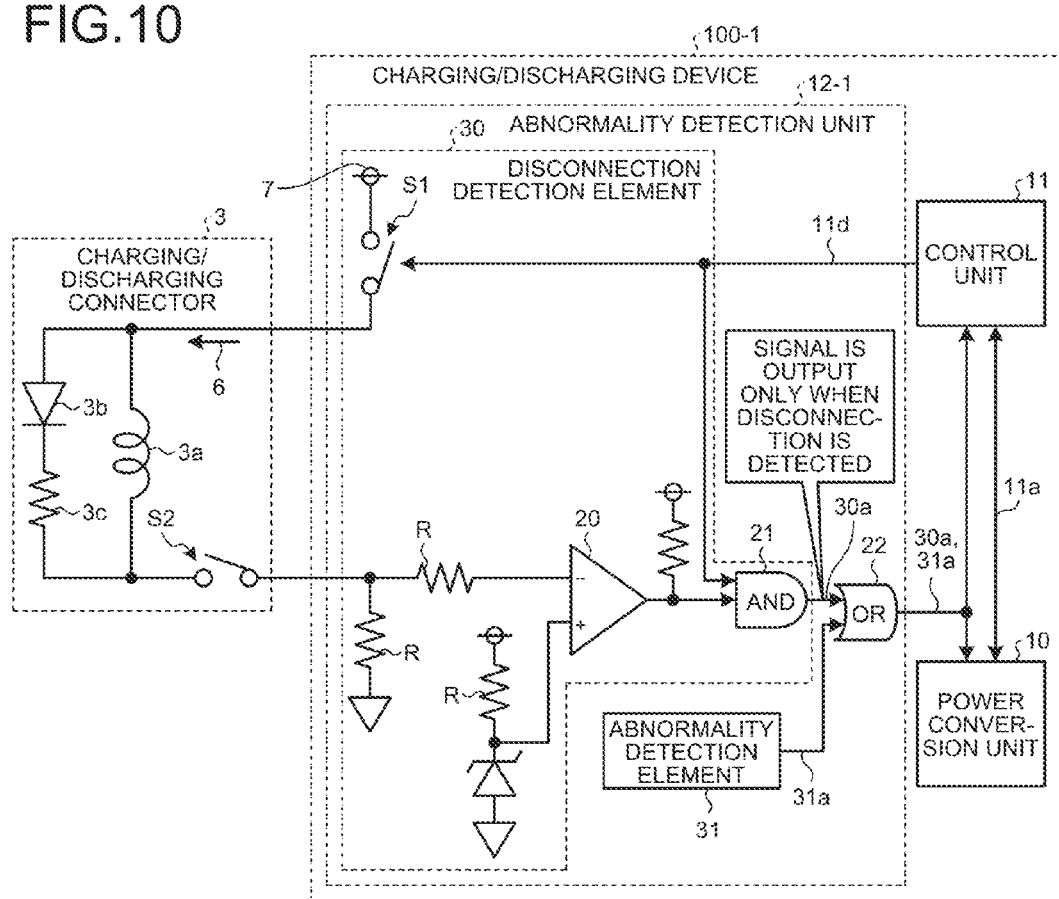
FIG. 10 is a diagram showing a modification of a charging/discharging device according to the first embodiment of the present invention.

FIG. 10 is a diagram showing a modification of a charging/discharging device 100-1 according to the first embodiment of the present invention. The different point of the charging/discharging device 100-1 from the charging/discharging device 100 in FIG. 4 is that an abnormality detection unit 12-1 is used instead of the abnormality detection unit 12. The abnormality detection unit 12-1 includes an OR circuit 22 in addition to the disconnection detection element 30 (a first abnormality detection element) and the abnormality detection element 31 (a second abnormality detection element). The abnormality detection signal 30a from the AND circuit 21 and the abnormality detection signal 31a from the abnormality detection element 31 are input to the OR circuit 22, and the OR circuit 22 outputs the abnormality detection signal 30a or the abnormality detection signal 31a to the control unit 11 and the power conversion unit 10. Specifically, the abnormality detection unit 12-1 includes the first abnormality detection element (30), which outputs a first abnormality detection signal (30a) for stopping the operation of the power conversion unit 10 when it is detected that the electrical connection between the storage battery and the charging/discharging device 100-1 has been disconnected and a signal indicating operation start of the power conversion unit 10 (the ON/OFF signal 11d) is output from the control unit 11, a second abnormality detection element (31), which outputs a second abnormality detection signal (31a) for stopping the operation of the power conversion unit 10 when an abnormality (overcurrent or the like) other than the abnormality detected by the first abnormality detection element (30) is detected, and the OR circuit 22, which outputs the first abnormality detection signal (30a) from the first abnormality detection element (30) or the second abnormality detection signal (31a) from the second abnormality detection element (31).

According to the first embodiment, because the abnormality detection signal 30a is output only when the AND condition is established in the AND circuit 21, the abnormality detection signal 30a is input to the OR circuit 22 only when connector disconnection is detected. Even if the number of signal lines on which the abnormality detection signals 30a and 31a are transmitted is reduced from two to one, the abnormality detection signal 30a or the abnormality detection signal 31a output from the OR circuit 22 can be transmitted to the control unit 11 and the power conversion unit 10 via the signal line. Furthermore, by reducing the number of signal lines for the abnormality detection signals 30a and 31a from two to one, the circuit configuration is simplified as compared to the charging/discharging device 100 shown in FIG. 4, thereby enabling cost reduction and improvement of the reliability.

As in the charging/discharging device 100 shown in FIG. 4, the charging/discharging device 100-1 shown in FIG. 10 can be configured such that the output from the OR circuit 22 is input only to the power conversion unit 10, the output from the OR circuit 22 is input only to the control unit 11, or the output from the OR circuit 22 is input to the control unit 11 and the power conversion unit 10. That is, if the charging/discharging device is configured such that the output from the OR circuit 22 is input only to the power conversion unit 10, the configuration of the charging/discharging device 100-1 can be simplified and the operation of the power conversion unit 10 can be stopped immediately. If the charging/discharging device is configured such that the output from the OR circuit 22 is input only to the control unit 11, the manufacturing cost of the charging/discharging device 100-1 can be reduced. Furthermore, if the charging/discharging device is configured such that the output from the OR circuit 22 is input to the control unit 11 and the power conversion unit 10, the operation of the power conversion unit 10 can be stopped immediately and the reliability can be improved.

As explained above, the charging/discharging device 100 according to the first embodiment is interposed between the system power supply 1 and a storage battery (for example, a storage battery mounted on the car 4) and performs charging/discharging of the storage battery. The charging/discharging device 100 is configured to include the connector 3 that electrically connects the storage battery and the charging/discharging device 100, the cable 15 that is connected to the connector 3 at one end and is connected to the charging/discharging device 100 at the other end, the power conversion unit 10 that, when AC power is input from a first input/output terminal (see FIG. 5) side, operates as an AC/DC converter and outputs desired DC power to the side of a second input/output terminal (see FIG. 5), which is different from the first input/output terminal, and that, when DC power from the storage battery is input from the second input/output terminal, operates as a DC/AC converter and outputs desired AC power from the first input/output terminal side, the control unit 11 that controls the operation of the power conversion unit 10, the abnormality detection unit 12 that outputs the abnormality detection signal 30a for stopping the operation of the power conversion unit 10 to at least any of the control unit 11 and the power conversion unit 10, when it is detected that the electrical connection between the storage battery and the charging/discharging device 100 has been disconnected and a signal indicating the operation start of the power conversion unit 10 (the ON/OFF signal 11d) is output from the control unit 11 (that is, when the output from the comparator 20 and the ON signal from the control unit 11 are input to the AND circuit 21). With this configuration, an error is detected only when connector disconnection or disconnection of the cable 15 occurs. Therefore, the protection function of the power conversion unit 10 can be stopped only when the connector is disconnected or the cable 15 is disconnected. Accordingly, it is possible to achieve both prevention of breakage of the power conversion unit 10 when an abnormality other than connector disconnection and disconnection occurs and prevention of an unnecessary operation of the protection function of the power conversion unit 10. As a result, the reliability can be improved such that, for example, the charging/discharging device 100 can be prevented from being broken and an operator can be prevented from receiving an electric shock.

Second Embodiment.

The second power conversion unit 16 shown in FIG. 5 is configured from two single-phase inverters. Therefore, the charging/discharging device 100 requires three drive signals 18a to drive the power conversion units (16 and 17). Meanwhile, a general microcomputer constituting the control unit 11 has about two outputs. Therefore, to drive the power conversion units (16 and 17), two or more microcomputers are required. Furthermore, a communication signal line is required for transmitting and receiving information between the two microcomputers. A second embodiment is a configuration example of a charging/discharging device 100-2 provided with two microcomputers. Like parts as those described in the first embodiment are denoted by like reference signs and explanations thereof will be omitted, and only different points from the first embodiment are explained here.

Figure 11:
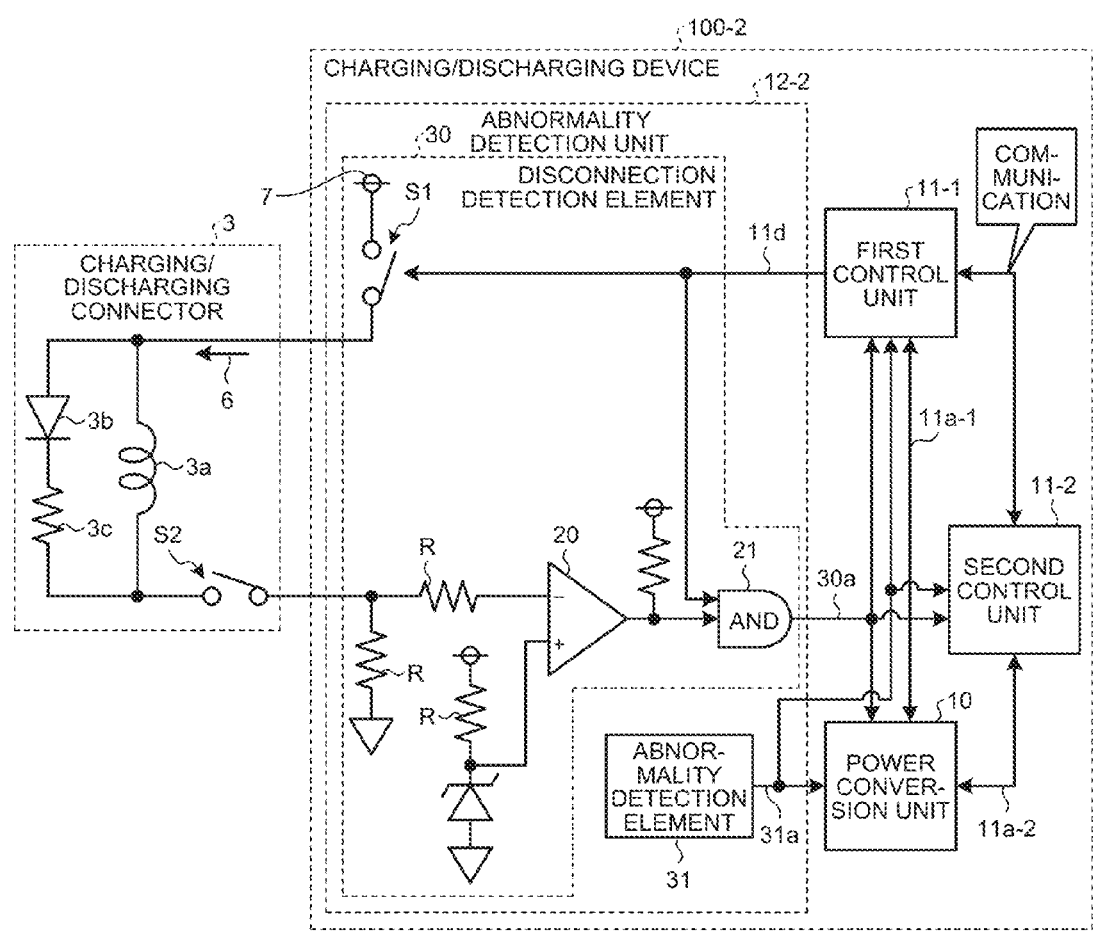
FIG. 11 is a diagram showing the configuration of a charging/discharging device according to a second embodiment of the present invention.

FIG. 11 is a diagram showing the configuration of the charging/discharging device 100-2 according to the second embodiment of the present invention. The different point of the charging/discharging device 100-2 from the charging/discharging device 100 shown in FIG. 4 is that two control units (a first control unit 11-1 and a second control unit 11-2) are used instead of the control unit 11, the first control unit 11-1 and the second control unit 11-2 are configured to be communicable with each other, the abnormality detection signal 30a from the disconnection detection element 30 and the abnormality detection signal 31a from the abnormality detection element 31 can be input to each of the control units, and an operation signal 11a-1 from the first control unit 11-1 and an operation signal 11a-2 from the second control unit 11-2 are input to the power conversion unit 10. For example, the first control unit 11-1 is provided so as to be able to control the first power conversion unit 17 shown in FIG. 5, and the second control unit 11-2 is provided so as to be able to control the second power conversion unit 16 shown in FIG. 5.

Figure 12:
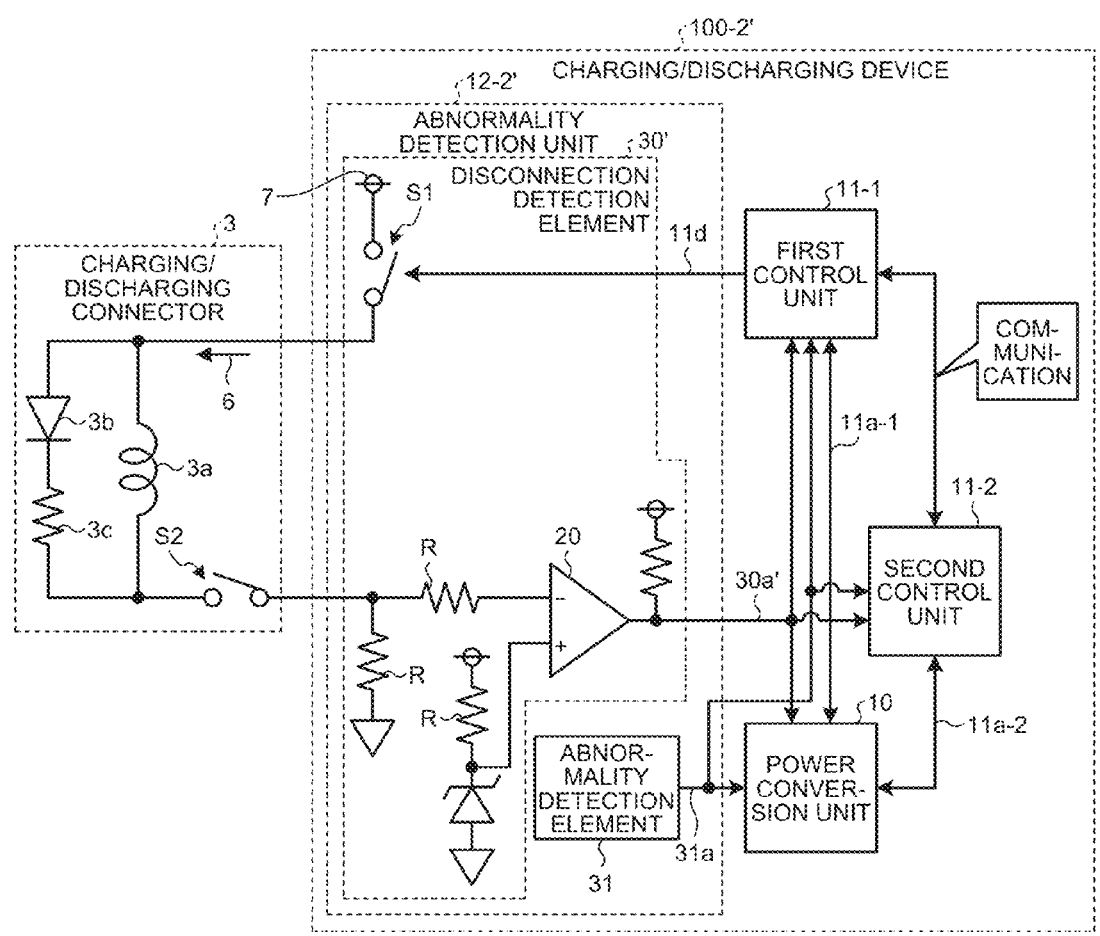
FIG. 12 is a diagram showing the configuration of a conventional charging/discharging device.

FIG. 12 is a diagram showing the configuration of a conventional charging/discharging device 100-2'. The different point of FIG. 12 from FIG. 11 is that an abnormality detection unit 12-2' is used instead of the abnormality detection unit 12-2, the disconnection detection element 30' and the abnormality detection element 31 are used in the abnormality detection unit 12-2' as in the abnormality detection unit 12' shown in FIG. 7, and the AND circuit 21 shown in FIG. 11 is not used in the disconnection detection element 30'.

Figure 13:
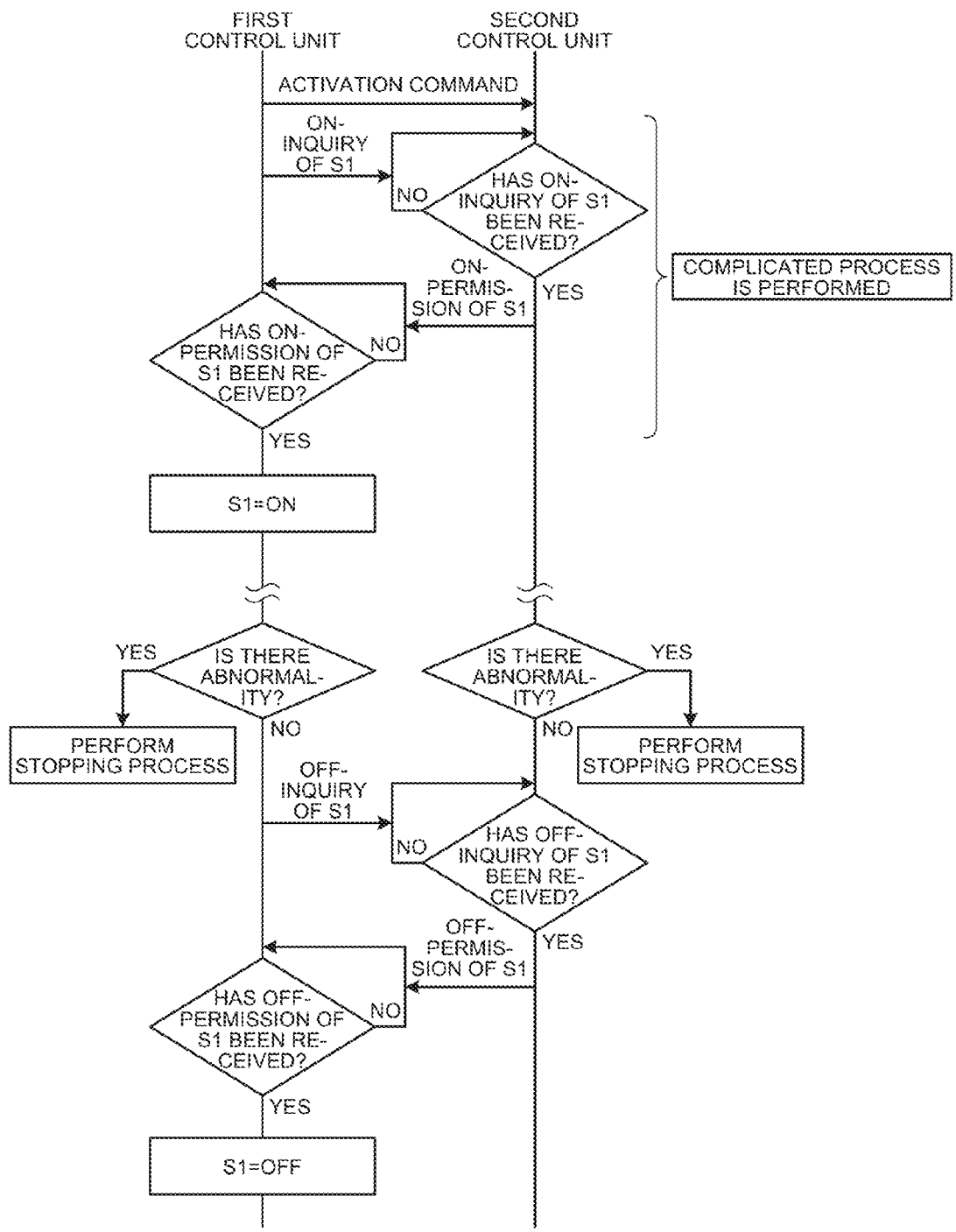
FIG. 13 is a first flowchart for explaining an operation of the conventional charging/discharging device.

FIG. 13 is a first flowchart for explaining an operation of the conventional charging/discharging device 100-2'. FIG. 13 schematically shows a process to be performed by the first control unit 11-1 and the second control unit 11-2 in the conventional charging/discharging device 100-2'. For example, when a charging/discharging starting operation is performed, the first control unit 11-1 notifies the second control unit 11-2 of a charging/discharging start command (an activation command) through the communication line, and the first control unit 11-1 also makes an ON-inquiry (an inquiry as to whether the switch S1 can be turned on) to the second control unit 11-2. The second control unit 11-2 having received the ON-inquiry notifies the first control unit 11-1 of an ON-permission of the switch S1, and the first control unit 11-1 having received the ON-permission turns on the switch S1.

In this manner, in the conventional charging/discharging device 100-2', when the second control unit 11-2 is notified of the "ON-inquiry", the second control unit 11-2 can ascertain the state of the switch S1, and then, when having received the abnormality detection signal 30a, the second control unit 11-2 can ascertain the fact that disconnection or the like occurs.

However, in the process shown in FIG. 13, it is required to perform communication between the first control unit 11-1 and the second control unit 11-2 several times. Therefore, the time after a charging/discharging operation has been performed until the switch S1 is turned on becomes long and thus activation of the power conversion unit 10 becomes slow. When a charging/discharging stop operation is performed after the switch S1 is turned on, the first control unit 11-1 makes an inquiry as to whether the switch S1 can be turned off (an OFF-inquiry) to the second control unit 11-2; however, explanations of this inquiry will be omitted.

Figure 14:
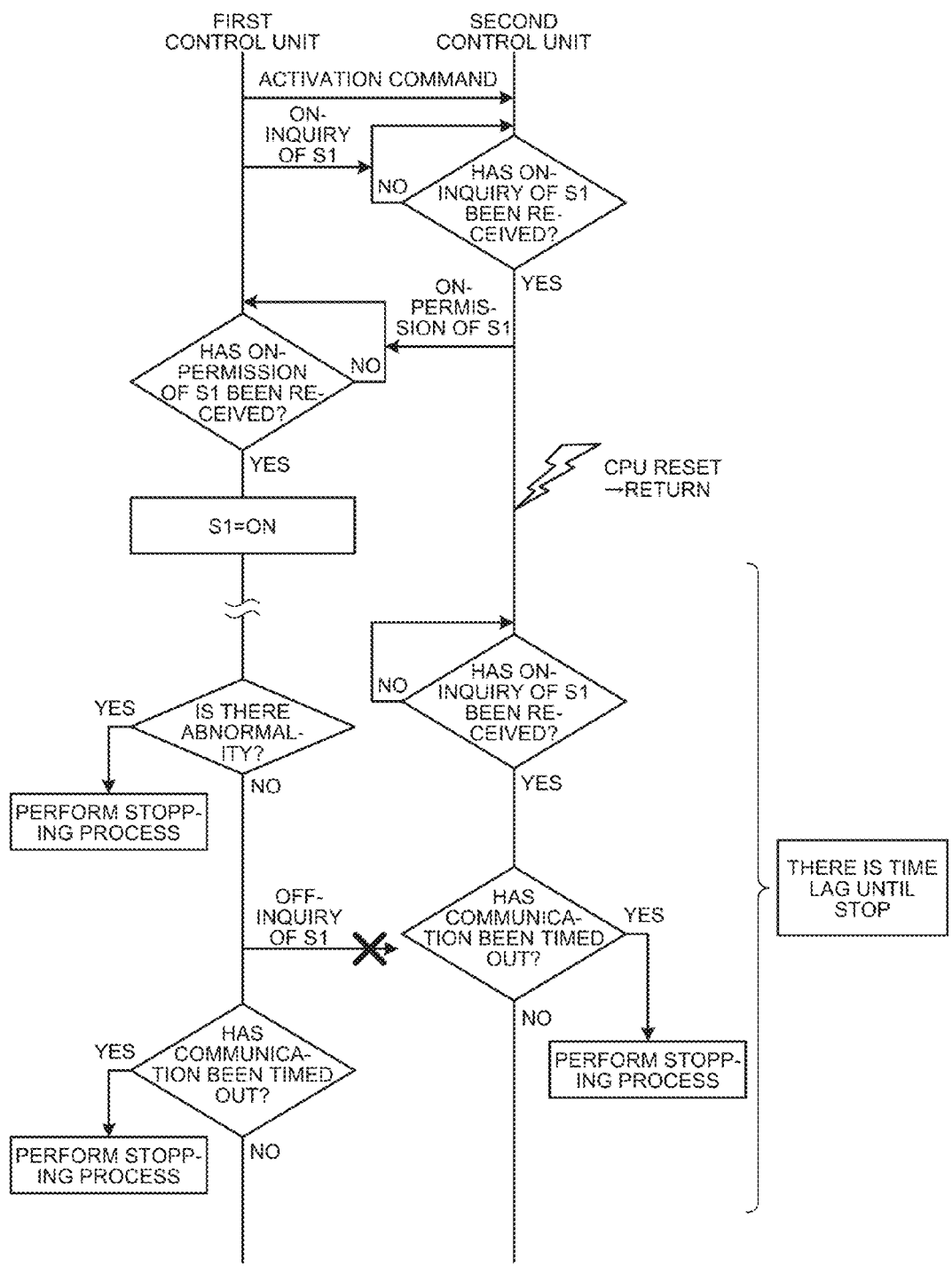
FIG. 14 is a second flowchart for explaining an operation of the conventional charging/discharging device.

FIG. 14 is a second flowchart for explaining an operation of the conventional charging/discharging device 100-2'. The flowchart in FIG. 14 shows an operation when the second control unit 11-2 having notified the first control unit 11-1 of an ON-permission of the switch S1 is CPU-reset due to a certain cause. In this case, the second control unit 11-2 performs a process of determining whether the ON-inquiry of the switch S1 has been received again.

However, in this case, because the second control unit 11-2 is not notified of the "ON-inquiry" of the switch S1, the communication between the first control unit 11-1 and the second control unit 11-2 is timed out after a predetermined time has passed, and a stopping process is performed due to time-out of the communication. Therefore, even until the stopping process is performed, the operation of the power conversion unit 10 is continued and thus the operation of the power conversion unit 10 cannot be stopped immediately even if an abnormality such as overcurrent has occurred during this period. If connector disconnection occurs during this period, an operator may receive an electric shock.

Figure 15:
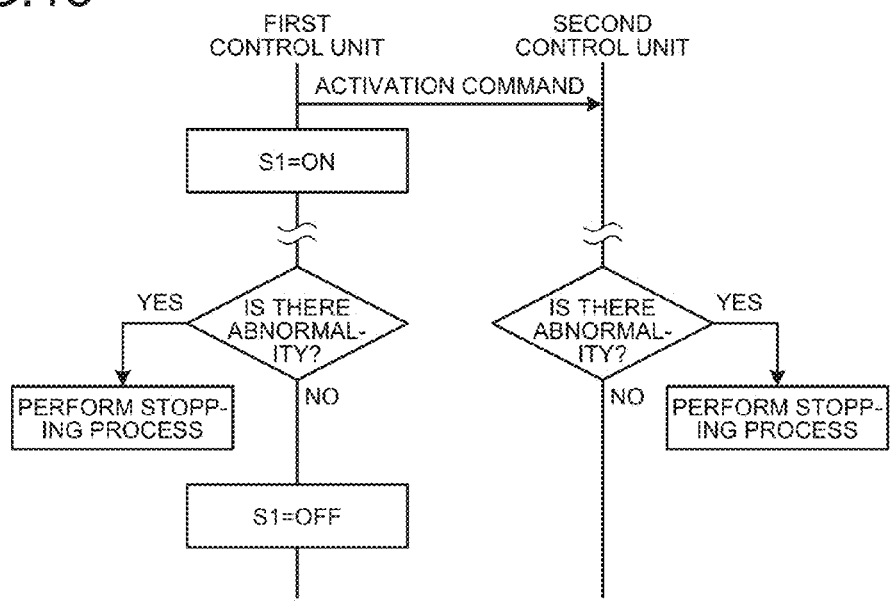
FIG. 15 is a first flowchart for explaining an operation of the charging/discharging device according to the second embodiment of the present invention.

FIG. 15 is a first flowchart for explaining an operation of the charging/discharging device 100-2 according to the second embodiment of the present invention and corresponds to the flowchart in FIG. 13. In the charging/discharging device 100-2 according to the second embodiment, when the AND condition of the output signal from the comparator 20 and the ON/OFF signal 11d from the first control unit 11-1 is established, the abnormality detection signal 30a is output to each of the control units. Therefore, the first control unit 11-1 does not need to make the ON-inquiry of the switch S1 to the second control unit 11-2 and can operate the switch S1. Accordingly, the time after a charging/discharging operation is performed until the switch S1 is turned on can be reduced and thus the power conversion unit 10 can be activated immediately.

Figure 16:
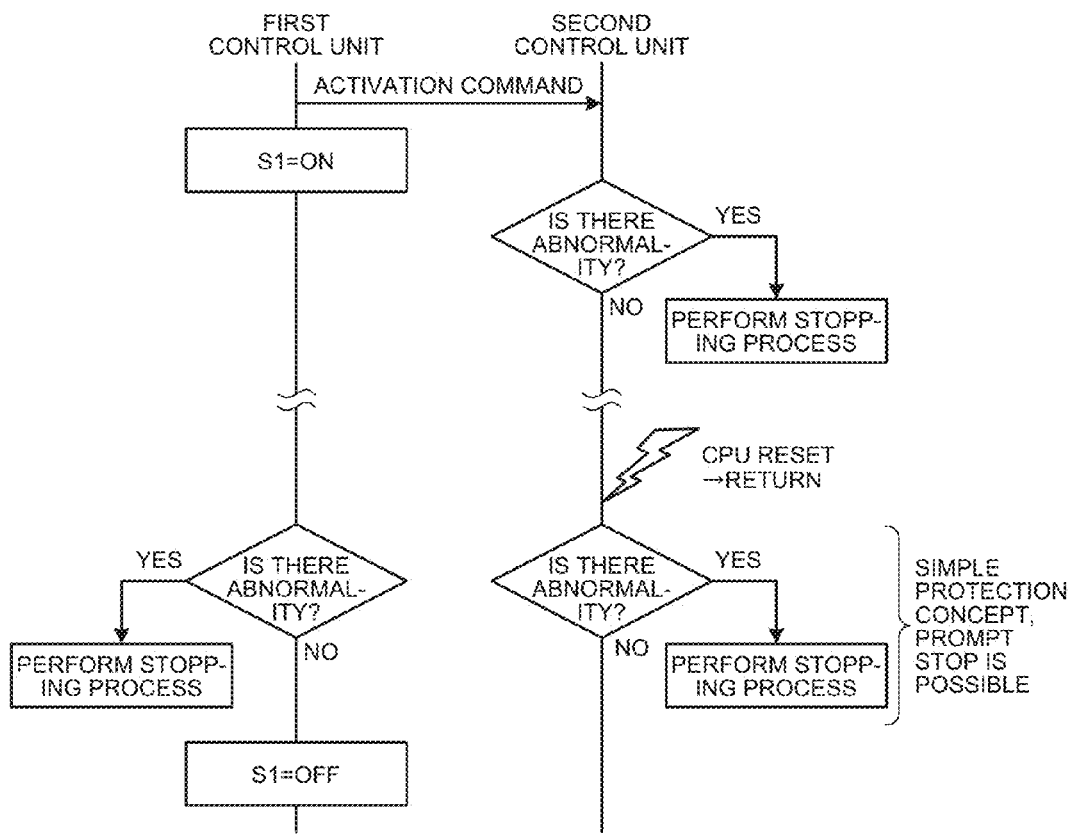
FIG. 16 is a second flowchart for explaining an operation of the charging/discharging device according to the second embodiment of the present invention.

FIG. 16 is a second flowchart for explaining an operation of the charging/discharging device 100-2 according to the second embodiment of the present invention and corresponds to the flowchart in FIG. 14. In the charging/discharging device 100-2 according to the second embodiment, when the AND condition of the output signal from the comparator 20 and the ON/OFF signal 11d from the first control unit 11-1 is established, the abnormality detection signal 30a is output to each of the control units. Therefore, the first control unit 11-1 does not need to make the ON-inquiry of the switch S1 to the second control unit 11-2, and the second control unit 11-2 can perform the stopping process of the power conversion unit promptly on the basis of the abnormality detection signal 30a, and an operator can be prevented from receiving an electric shock.

In the second embodiment, the configuration is such that the ON/OFF signal 11d from the first control unit 11-1 is input to the switch S1 and the AND circuit 21. However, the configuration may be such that the ON/OFF signal 11d is output from the second control unit 11-2.

According to the second embodiment, the output of the AND circuit 21 is input to all of the first control unit 11-1, the second control unit 11-2, and the power conversion unit 10; however, the present invention is not limited thereto. For example, if the charging/discharging device 100-2 is configured such that the abnormality detection signal 30a is input only to the power conversion unit 10, the configuration of the charging/discharging device 100-2 can be simplified and the operation of the power conversion unit 10 can be stopped immediately. If the charging/discharging device 100-2 is configured such that the abnormality detection signal 30a is input only to each of the control units (11-1 and 11-2), the manufacturing cost of the charging/discharging device 100-2 can be reduced. Furthermore, if the charging/discharging device 100-2 is configured such that the abnormality detection signal 30a is input to both the control units (11-1 and 11-2) and the power conversion unit 10, the operation of the power conversion unit 10 can be stopped immediately and the reliability can be improved.

It is also possible to use the OR circuit 22 shown in FIG. 10 in the charging/discharging device 100-2 according to the second embodiment. For example, the charging/discharging device 100-2 can be configured such that the abnormality detection signal 30a from the AND circuit 21 and the abnormality detection signal 31a from the abnormality detection element 31 are input to the OR circuit 22, and the output of the OR circuit 22 is input to at least any of the first control unit 11-1, the second control unit 11-2, and the power conversion unit 10. Even with such a configuration, similarly to the first embodiment, it is possible to suppress an increase in size and cost of the charging/discharging device 100-2.

As explained above, the charging/discharging device 100-2 according to the second embodiment is configured to include the connector 3, the cable 15, the first power conversion unit 17 that, when AC power is input from the first input/output terminal side, operates as an AC/DC converter and outputs desired DC power to the side of the second input/output terminal, which is different from the first input/output terminal and that, when DC power from the storage battery is input from the second input/output terminal side, operates as an DC/AC converter and outputs desired AC power from the first input/output terminal side, the second power conversion unit 16 that converts DC power from the first power conversion unit 17 to DC power of a desired value and outputs the DC power to the second input/output terminal side and that converts DC power input from the second input/output terminal side to DC power of a desired value and outputs the DC power to the first power conversion unit 17, the first control unit 11-1 that controls the operation of the first power conversion unit 17, the second control unit 11-2 that controls the operation of the second power conversion unit 16, and the abnormality detection unit 12-2 that outputs the abnormality detection signal 30a for stopping the operation of each of the power conversion units to at least any of the control units (11-1 and 11-2) and the power conversion units (16 and 17), when it is detected that the electrical connection between the storage battery and the charging/discharging device 100-2 has been disconnected and a signal indicating the operation start of each of the power conversion units (16 and 17) is output from any of the control units (11-1 and 11-2). According to this configuration, effects identical to those of the first embodiment can be acquired, and even if the power conversion unit 10 is controlled by two microcomputers, the power conversion unit 10 can be activated immediately when a charging/discharging operation is performed and an operator can be prevented from receiving an electric shock.

Furthermore, the application of the charging/discharging devices 100, 100-1, and 100-2 according to the first and second embodiments is not limited to the electric car 4, and the charging/discharging devices 100, 100-1, and 100-2 are also applicable to other storage batteries apart from the storage battery of the electric car 4, and are, for example, applicable to a power storage device dedicated to the household loads 2.

Further, the charging/discharging device according to the embodiments of the present invention is only an example of the content of the present invention. The charging/discharging device can be combined with other well-known techniques, and it is needless to mention that the present invention can be configured while modifying it without departing from the scope of the invention, such as omitting a part of the charging/discharging device.

INDUSTRIAL APPLICABILITY

As described above, the present invention is mainly applicable to a charging/discharging device, and particularly useful as an invention that can achieve further improvement of the reliability.

The invention claimed is:

1. A charging/discharging system that is interposed between a system power supply and a storage battery and performs charging/discharging of the storage battery, the charging/discharging system comprising:
   a charging/discharging that is adapted to electrically connect to the system power supply;
   a charging/discharging connector that is adapted to electrically connect the storage battery and the charging/discharging device and includes
   a lock mechanism that is adapted to maintain a mechanical connection state;
   a solenoid that operates the lock mechanism; and
   a switch that interlocks with the lock mechanism; and
   a charging/discharging cable that is connected to the charging/discharging connector at one end;
   the charging/discharging device comprising:
   a power conversion unit that operates as an AC/DC converter when AC power is input, and operates as a DC/AC converter when DC power from the storage battery is input;
   a control unit that controls an operation of the power conversion unit; and
   an abnormality detection unit that feeds power to the solenoid in response to a signal that is output from the control unit and does not output an abnormality detection signal when the signal is not output from the control unit.

2. The charging/discharging system according to claim 1, wherein the abnormality detection unit outputs the abnormality detection signal only to the control unit.

3. The charging/discharging system according to claim 1, wherein the abnormality detection unit outputs the abnormality detection signal only to the power conversion unit.

4. The charging/discharging system according to claim 1, wherein the abnormality detection unit outputs the abnormality detection signal to the control unit and the power conversion unit.

5. The charging/discharging system according to claim 1, wherein
the abnormality detection unit includes
a first abnormality detection element that outputs a first abnormality detection signal on a basis of the signal that is output from the control unit and the signal output from the switch that interlocks with the lock mechanism,
a second abnormality detection element that outputs a second abnormality detection signal when an abnormality other than an abnormality detected by the first abnormality detection element has been detected, and
an OR circuit that outputs the first abnormality detection signal from the first abnormality detection element or the second abnormality detection signal from the second abnormality detection element as the abnormality detection signal.

6. The charging/discharging system according to claim 5, wherein the first abnormality detection unit further comprises:
an AND gate configured to generate the first abnormality detection signal based on the signal that is output from the control unit and a signal indicative of a connector disconnection at the charging/discharging connector.

7. The charging/discharging system according to claim 5, wherein
the first abnormality detection signal is indicative of a connector disconnection at the charging/discharging connector, and
the second abnormality detection signal is indicative of an abnormality other than a disconnection at the charging/discharging connector.

8. The charging/discharging system according to claim 1, wherein the abnormality detection unit outputs the abnormality detection signal on a basis of the signal that is output from the switch and the signal that is output from the control unit.

9. The charging/discharging system according to claim 1, wherein the abnormality detection unit outputs the abnormality detection signal to at least any of the first and second control unit and the power conversion unit.

10. The charging/discharging system according to claim 1, wherein the abnormality detection signal is indicative of an abnormality in the charging/discharging connector.

11. The charging/discharging system according to claim 1, wherein the abnormality detection unit further comprises:
an AND gate configured to generate the abnormality detection signal based on the signal that is output from the control unit and a signal indicative of a connector disconnection at the charging/discharging connector.

12. The charging/discharging system according to claim 1, wherein the abnormality detection unit further comprises:
a disconnection detection element that outputs a first abnormality detection signal on a basis of the signal that is output from any of the first and second control units and the signal output from the switch that interlocks with the lock mechanism; and
an abnormality detection element that outputs a second abnormality detection signal when an abnormality other than an abnormality detected by the first abnormality detection element has been detected.

13. The charging/discharging system according to claim 1, wherein the abnormality detection unit is not located on a vehicle.

14. A charging/discharging system that is interposed between a system power supply and a storage battery and performs charging/discharging of the storage battery, the charging/discharging system comprising:
a charging/discharging device that is adapted to electrically connect to the system power supply;
a charging/discharging connector that is adapted to electrically connect the storage battery and the charging/discharging device and includes
a lock mechanism that is adapted to maintain a mechanical connection state;
a solenoid that operates the lock mechanism; and
a switch that interlocks with the lock mechanism; and
a charging/discharging cable that is connected to the charging/discharging connector at one end;
the charging/discharging device comprising:
a first power conversion unit that operates as an AC/DC converter when AC power is input, and operates as a DC/AC converter when DC power is input;
a second power conversion unit that converts DC power from the first power conversion unit to DC power of a desired value and converts DC power from the storage battery to DC power of a desired value;
a first control unit that controls an operation of the first power conversion unit;
a second control unit that controls an operation of the second power conversion unit; and
an abnormality detection unit that feeds power to the solenoid in response to a signal that is output from any of the first and second control units and does not output an abnormality detection signal when the signal is not output from any of the first and second control units.

15. The charging/discharging system according to claim 14, wherein the abnormality detection unit outputs the abnormality detection signal only to each of the first and second control units.

16. The charging/discharging system according to claim 14, wherein the abnormality detection unit outputs the abnormality detection signal only to each of the power conversion units.

17. The charging/discharging system according to claim 14, wherein the abnormality detection unit outputs the abnormality detection signal to each of the first and second control units and each of the power conversion units.

18. The charging/discharging system according to claim 14, wherein
the abnormality detection unit includes
a first abnormality detection element that outputs a first abnormality detection signal on a basis of the signal that is output from any of the first and second control units and the signal output from the switch that interlocks with the lock mechanism,
a second abnormality detection element that outputs a second abnormality detection signal when an abnormality other than an abnormality detected by the first abnormality detection element has been detected, and an OR circuit that outputs the first abnormality detection signal from the first abnormality detection element or the second abnormality detection signal from the second abnormality detection element as the abnormality detection signal.

19. The charging/discharging system according to claim 14, wherein the abnormality detection unit outputs the abnormality detection signal on a basis of the signal that is output from the switch and the signal that is output from any of the first and second control units.

20. The charging/discharging system according to claim 14, wherein the abnormality detection unit outputs the abnormality detection signal to at least any of the first and second control units and the power conversion units.

* * * * *